United States Patent
Luber

(10) Patent No.: US 11,969,833 B2
(45) Date of Patent: Apr. 30, 2024

(54) COMPACT SELF-COMPELLED WELDING STATION

(71) Applicant: Rod Luber, Yukon, OK (US)

(72) Inventor: Rod Luber, Yukon, OK (US)

( * ) Notice: Subject to any disclaimer, the term of this patent is extended or adjusted under 35 U.S.C. 154(b) by 632 days.

(21) Appl. No.: 17/300,069

(22) Filed: Mar. 1, 2021

(65) Prior Publication Data

US 2022/0274213 A1    Sep. 1, 2022

(51) Int. Cl.
*B23K 37/02* (2006.01)
*B23K 31/02* (2006.01)

(52) U.S. Cl.
CPC .............. *B23K 37/02* (2013.01); *B23K 31/02* (2013.01); *B23K 37/0252* (2013.01); *B23K 37/0258* (2013.01); *B23K 37/0282* (2013.01)

(58) Field of Classification Search
CPC .... B23K 37/02; B23K 31/02; B23K 37/0252; B23K 37/0258; B23K 37/0282; B23K 37/0294
See application file for complete search history.

(56) References Cited

U.S. PATENT DOCUMENTS

| | | | |
|---|---|---|---|
| 4,759,560 A | 7/1988 | Virgulti | |
| 5,809,755 A * | 9/1998 | Velke | B62D 51/02 56/14.7 |
| 6,051,809 A | 4/2000 | Coletta | |
| 6,596,972 B1 | 6/2003 | Di Novo | |
| 6,989,509 B2 | 1/2006 | Silvestro | |
| 7,374,185 B1 * | 5/2008 | Hollis | B23K 9/323 280/47.35 |
| 7,703,777 B2 * | 4/2010 | Horn, Jr. | F04B 35/06 280/47.35 |
| 10,144,083 B2 | 12/2018 | Radtke | |
| 2004/0182846 A1 * | 9/2004 | Silvestro | F02B 63/04 219/133 |
| 2008/0006184 A1 * | 1/2008 | Simon | B60R 9/06 224/521 |
| 2015/0069033 A1 | 3/2015 | Stockton | |

* cited by examiner

*Primary Examiner* — Robert G Bachner
(74) *Attorney, Agent, or Firm* — Randal Homburg

(57) ABSTRACT

A self-propelled welding station including a base frame having at least one front wheel and at least two rear drive wheels, provides and independent mobility drive system with a motor and steering means for a seated or standing operator, and a utility drive system providing a self-contained, motorized welder with welding leads for remote welding and a secondary electrical generating system providing a plurality of A/C electrical outlets, an air compressor assembly to provide compressed air to operate air tools and forced air, a plurality of accessory tool and supply storage containers, accessory equipment and a bottled gas system for welding gases, gauges and hoses. The mobility drive system motor is independent from the motorized welder so that the station may be moved whether the motorized welder is on or off, and the motorized welder may be operated with the drive motor system on or off.

6 Claims, 7 Drawing Sheets

COMPACT SELF-COMPELLED WELDING STATION

CROSS REFERENCE TO RELATED APPLICATIONS

None.

I. BACKGROUND OF THE INVENTION

1. Field of Invention

A self-propelled welding station including a transport frame with an independent motor and steering means for a seated or standing operator, provides a self-contained welder generator with welding leads for remote welding with an independent electrical generating system providing a plurality of A/C electrical outlets, an air compressor assembly to provide compressed air to operate air tools and forced air, a plurality of tool and supply storage containers, and a bottled gas system for an oxyacetylene torch and hoses. A drive motor system is independent from the welder generator so that the station may be compelled while the welder generator is on or off, and the welder generator may be operated with the drive motor system on or off.

2. Description of Prior Art

A preliminary review of prior art patents was conducted by the applicant which reveal prior art patents in a similar field or having similar use. However, the prior art inventions do not disclose the same or similar elements as the present self-compelled welding station, nor do they present the material components in a manner contemplated or anticipated in the prior art.

Several portable welders have been viewed in the prior art which provide the welder on some mobile platform, although none of them appear to be internally mobile. They require either a person to push or pull the mobile welder or they are towed behind some other vehicle on a trailer or bed of a vehicle. An auxiliary power take off for an engine driven portable welder is the subject of U.S. Patent Application No. 2015/0069033 to Stockton. This PTO is connected to a separate device as a mechanical power supply.

An air compressor, and electrical generator are provided on a cart with lengths of power cord with an optional welder that could be added to the cart, as found in U.S. Pat. No. 7,703,777 to Horn, Jr. The same welder, generator, air compressor arrangement is found in another U.S. Pat. No. 6,989,509 to Silvestro, except with a gear box and a housing. It does not require a transport means, which makes it potentially integrated with another portable instrument. In U.S. Pat. No. 6,596,972 to Di Novo, a portable welder on a four-wheeled shop cart provides a welder, accessories and storage locations and even gas welding tanks and hoses. A pickup bed welder, generator and air compressor are shown in U.S. Pat. No. 6,051,809 to Coletta.

A non-mobile welding station powered by a single engine was found in U.S. Pat. No. 10,144,083 to Radtke, which defines a welding system where an engine drives a generator to provide electrical output, the engine further attached to an air compressor system, a first welding system and a second welding system, the system occupying a stationary location where the two welding systems are independently operated.

The present mobile welding station provides a mobile platform that is self-propelled and operator steered to a location, by way of a first engine. This first engine solely operates the drive and steering system of the mobile platform. A second engine is operated within a welding generator that also provide power to a supply panel for the operation of a plurality of 110 and 220 volt AC electrical outlets affixed to a panel. An air compressor is operated from the welding generator, which provides leads for welding connected to the welding generator, as needed for the various type welders contemplated for use on this mobile welding station, i.e. Arc welders, MIG welders TIG welders, along with the necessary gases required for each type welder. Oxyacetylene tanks and hoses are mounted on the mobile welding stations. With this mobile assembly, the mobile welding station may be driven to and operated away from any available external power source, providing welding capacity, compressed air availability for air or air tool application, and AC tool plug in for one or more electrical tools. It can also be used in confined spaces, including multi-story construction projects, the mobile welding station being compact enough to be transported from floor to floor as needed during the construction project, either by use of a crane or by being transported in a personnel elevator on the location. It can be used at any location in a work shop, providing the station having the ability to be moved to the materials at a location, such as a field, an oilfield drilling operation, another building or along a fence line, as opposed to requiring transport the materials or product to be welded.

II. SUMMARY OF THE INVENTION

Welding is a common need in construction, industrial application, farming, ranching and manufacturing. Welders are either moved to a location of a product or object or the product or object are moved to the welder. Transportable welders are also commonly used when the application requires the welder to be moved to a location, either on trucks, carts or dollies. Sometimes these trucks, carts or dollies have other welding related equipment on the same transport medium or remote access to other helpful items and equipment.

Most commonly used in conjunction with welding are power tools, including saws, drills, cutter and grinders, air tools including sander, grinders, metal shears, and saws and compressed air or gas supplies for blowing air to remove debris and clearing surfaces, and even painting equipment for compressed air paint guns. Additionally, other welders may be connected to provide more than one welder.

The present mobile welding station provides a compact and full self-contained welding station which can be moved independently by an operator to a location outdoors, indoors, or from one construction floor to another in a multi-story construction project or into a secure storage location, as small a storage building, storage shed, or small space within a garage, upon or within a tool or transport trailer or a barn. It is all-inclusive, so very little necessary welding equipment and supplies would be required outside of that provided upon the mobile welding station. The power supply may also be used to provide power to other equipment used at the remote location, including lawn and garden equipment, pneumatic drills, or any other AC or air powered equipment.

III. DESCRIPTION OF THE DRAWINGS

The following drawings are submitted with this utility patent application.

IV. DESCRIPTION OF THE PREFERRED EMBODIMENT

Figure 1:
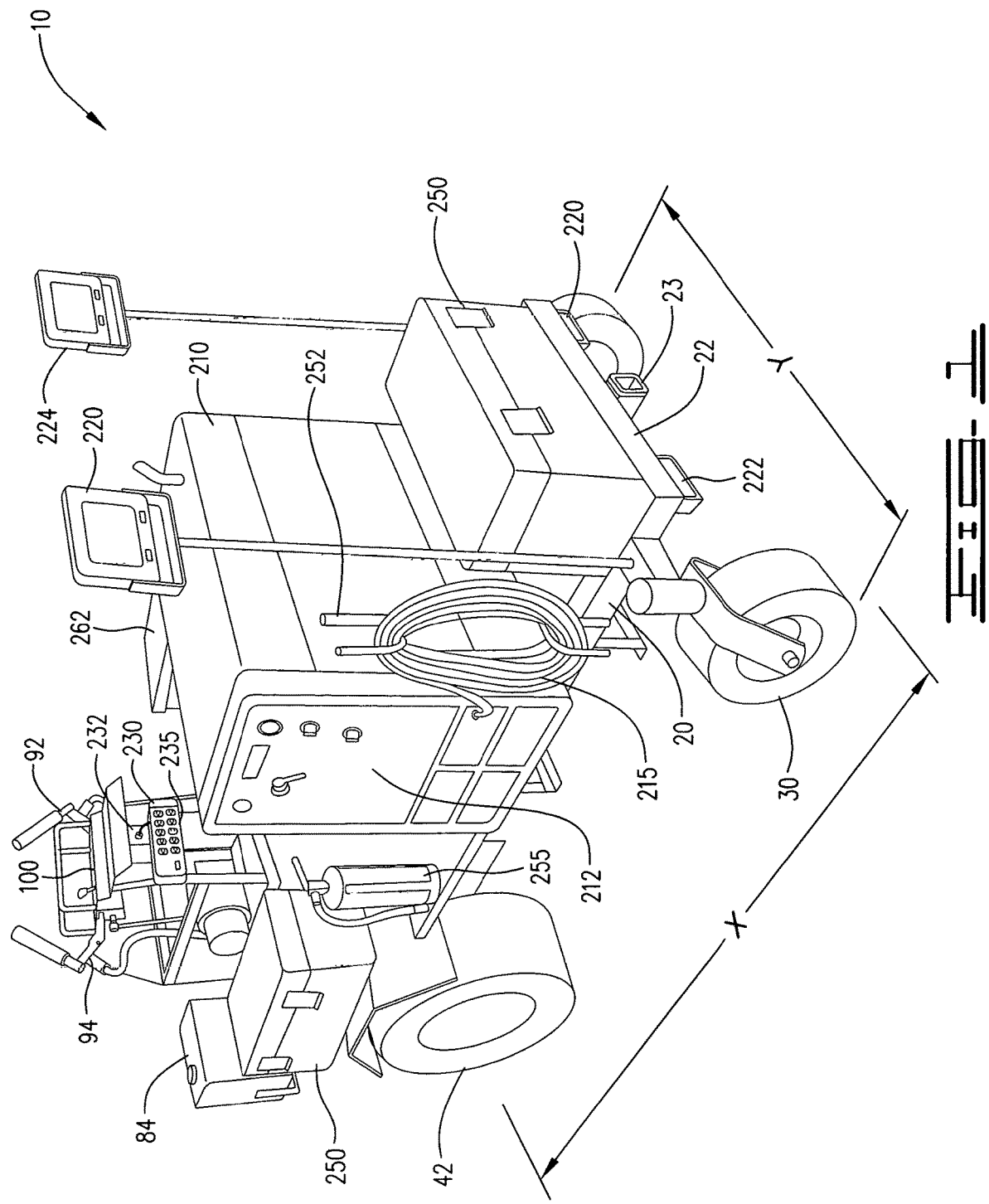
FIG. 1 is a front right side perspective view of the mobile welding station.
Figure 2:
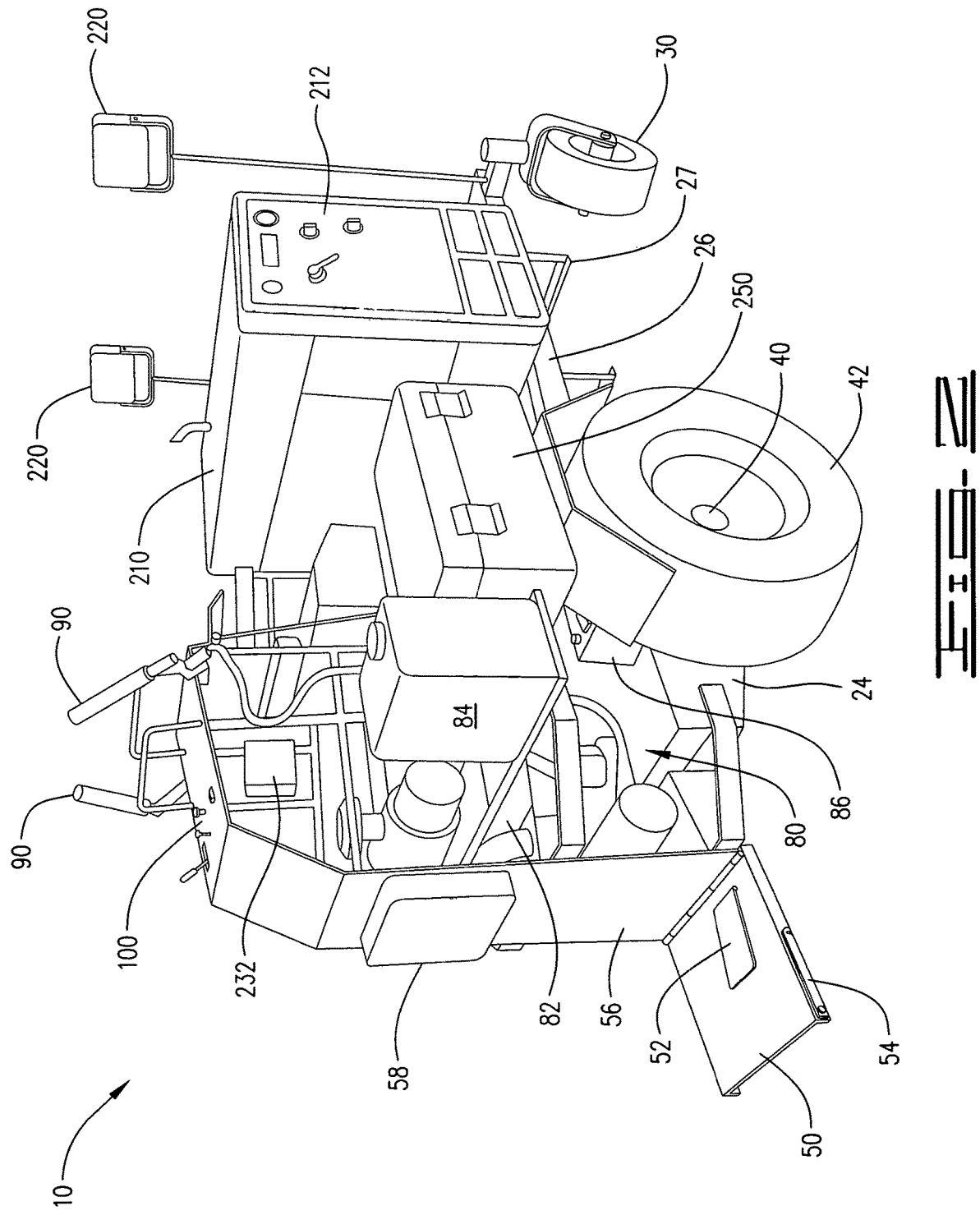
FIG. 2 is a rear right side perspective view of the mobile welding station.

A mobile welding station 10 providing a self-contained welding, gas cutting torch supply, electrical power generation and compressed air supply with self-contained separate powered mobility, shown in FIGS. 1-7 of the drawings, provides the station for use in remote locations in a reduced profile with the ability to be moved under power within a construction site, farming operation, multiple floors of building under construction, inside a building, a manufacturing complex, a maintenance facility, or outdoor locations where no local power supply is available. The mobile work station 10 is provided in profile small enough to fit on a utility trailer, the bed of a truck or within a freight elevator provided within a multiple story building or construction site. The mobile welding station 10 has a mobility drive system 80 which is operated separate and independently from a utility power system 200 supplied by a welding machine 200 with an integrated electrical power generator a separate compressed air supply system 240 incorporated into the mobile welding station 10, wherein the mobile welding station 10 can be moved under power with no utility operation, moved under power during utility operation or actively using the utility operations without operation of the mobility drive system 80.

As shown in FIGS. 1-6, the mobile welding station 10 defines a base frame 20 supported by at least two front dolly wheels 30 having a 360 degree rotation which are passive, pivotally attached near a front member 22 of the base frame 20, and a powered rear axle 40, shown in the drawing figures having two rear drive wheels 42 attached near a rear member 24 of the base frame 20, with two side support members 26 attached between the front member 22 and rear member 24 to complete the base frame 20. Numerous other secondary structural members may be supplied within the base frame 20 as required for stability integrity, not shown. This powered rear axle 40 may be provided with the pair of rear drive wheels 42, as shown, or with a track system, not shown, which could replace the rear drive wheels where supplied in a snowy or muddy outdoor environment. Likewise, the at least two front dolly wheels 30 could also be replaced by blades or snow skids in the same environment. The powered rear axle 40 is compelled and engaged under control of an operator positioned onboard the mobile welding station 20 upon an operator platform 50, shown in FIG. 6, using a stationary control assembly 100, as shown in FIG. 7.

It should be contemplated that the operator platform 50 could be replaced by a seat, but the standing operator platform 50, as shown and disclosed, is provided for both reduced size requirements as well as for safety reasons, requiring the operator to be duly engaged in the operation of the mobile welding station 10 with a foot on a deadman safety pedal 52 in order to operate and engage the mobility drive system 80 and stationary control assembly 100, wherein disengagement of the deadman safety pedal 52 immediately halts the mobility drive system 80 as disclosed subsequently within the specification. Additionally, the embodiment of the stationary control assembly 100 may be altered to include more or less than the operational components as disclosed and shown in FIG. 7, later described in further detail. It should also be stated that it is contemplated within the scope of this mobility drive system 80 that a four wheeled drive or three wheeled version could also be contemplated with modifications and additional components provided to enable these embodiments to operate. Also, the base frame 20, as shown in FIGS. 1-6, is square tubing welded together in a rectangular shape, which is provided as one embodiment, although other shapes and frame component shapes could be substituted to provide the utility functions required to support the components supplied on the mobile welding station 10, including the three wheeled version with a triangular shaped or polygonal shape.

The mobility drive system 80 comprises an engine 82, a fuel tank 84, a 12 volt D/C battery 86 and a movement control means 90. The engine 82 is a liquid fueled gasoline or electrical engine which supplies fuel from the fuel tank 84 and/or battery 86. This mobility drive system 80 is equal or better than that provided on commercial tractors, lawn and garden equipment and utility carts. As shown in FIG. 7, in the gas engine 82 embodiment disclosed in the drawings, the mobility drive system 80 further includes a key start ignition 102, a throttle 103, a choke 104 mounted within the stationary control panel 100, a right retractable control lever 94 and left retractable control lever 92 respectively situated on each side of the stationary control panel 100, and the deadman safety pedal 52, FIG. 6, all of which combine to start the engine 82, maintain the operation of the engine 82, to steer the mobile welding station 10 and to move the mobile welding station 10 forward or reverse at a selected speed.

By engaging, pulling, and/or pushing independently, the disclosed left and right retractable control levers 92, 94, allows the operator to move the retractable control levers to a respective outward for disengagement position, inward into a respective middle neutral position, forward for a forward movement of each independent rear drive wheel 42, rearward into a rear movement of each independent rear drive wheel 42, or forward and rear of each left and right control lever 92, 94, independently to steer the mobile welding platform 10 in a left or right direction. This optional control movements are accomplished through either a direct drive, belt drive or other mechanical engagement between the movement control means 90 and the mobility drive system 80, not shown.

In addition to the embodiment providing the left and right retractable control levers 92, 94, the steering control means 90 may be replaced by a steering wheel, a transmission, an accelerator and a differential or other directional control means, or any combination thereof, to compel and steer the mobile welding platform 10 under the active control of an operator. A brake system, not shown in the drawings, could also be employed into the mobility drive system 80, operated by either hand controls or additional foot means.

The utility power system 200 provides the energy to operate the components that are defined as essential in the utility power system 200, independent of the mobility drive system 80, as previously stated. The utility power system is empowered by the welding machine 210, centrally mounted upon the base frame 20, preferably between the front frame member 22 and the rear frame member 24. The welding machine 210 is a self contained welder which provides a primary 110/220 A/C volt electrical energy supply to the welding machine 210 in addition to a secondary electrical energy supply, the welding machine 210 being selected from those commercial welders including arc welders, MIG welders, TIG welders and other welding devices commonly used by those skilled in the art of welding. This welding machine 210 provides its own integrated controls 212, fuel supply, exhaust system and starting system, operating independently from any other outside power source. The secondary electrical energy supply is directed to an A/C electrical control panel 230 by way of a voltage regulator 232, the A/C electrical control panel 230 providing a plurality of 110 volt A/C outlets 236 and at least one 220 volt A/C power outlet 238 on a common power strip 235. Activation of this A/C electrical control panel 230 may be had through an optional accessory control switch 105 located on the stationary control panel 100, FIG. 7.

Figure 3:
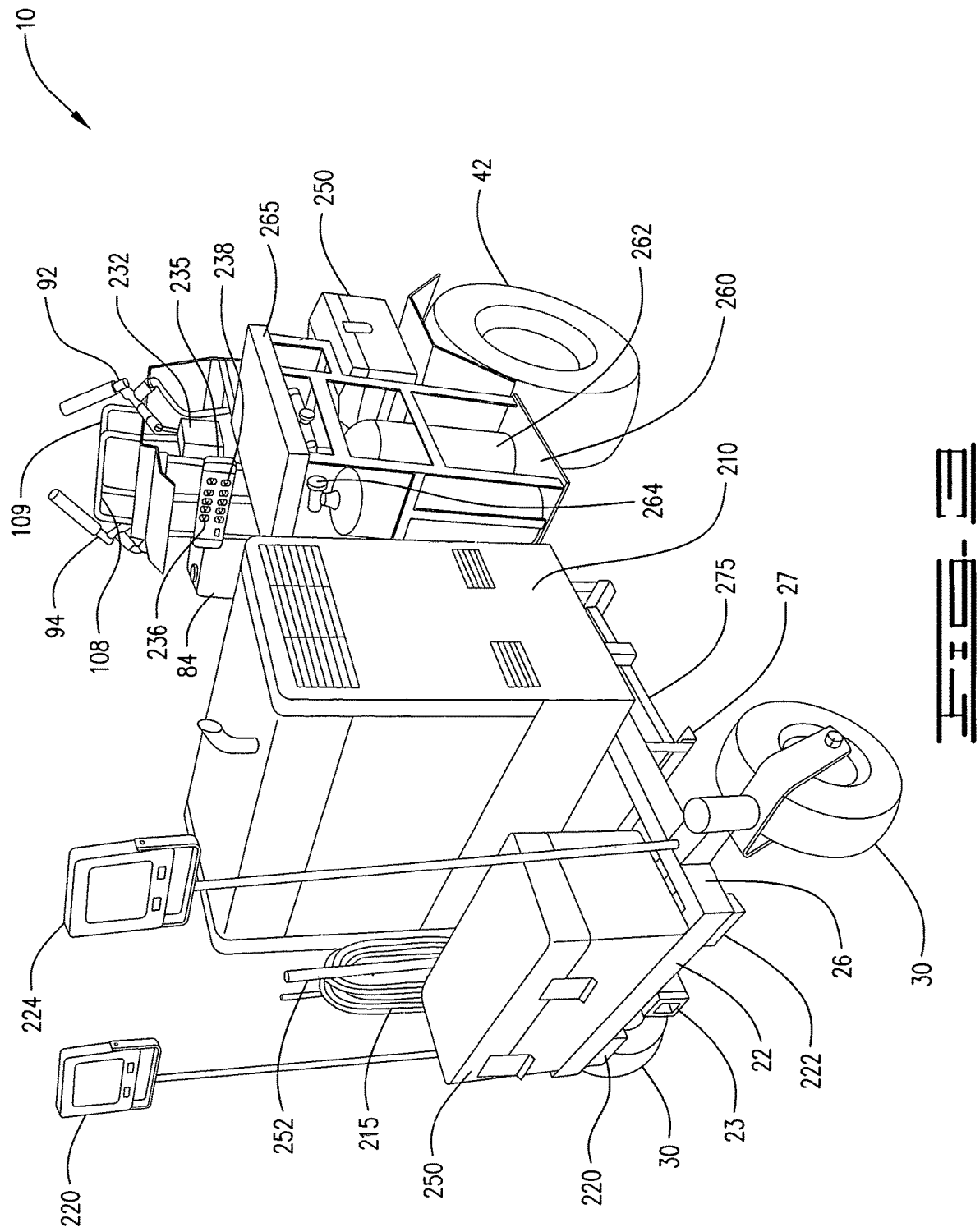
FIG. 3 is a front left side perspective view of the mobile welding station.
Figure 4:
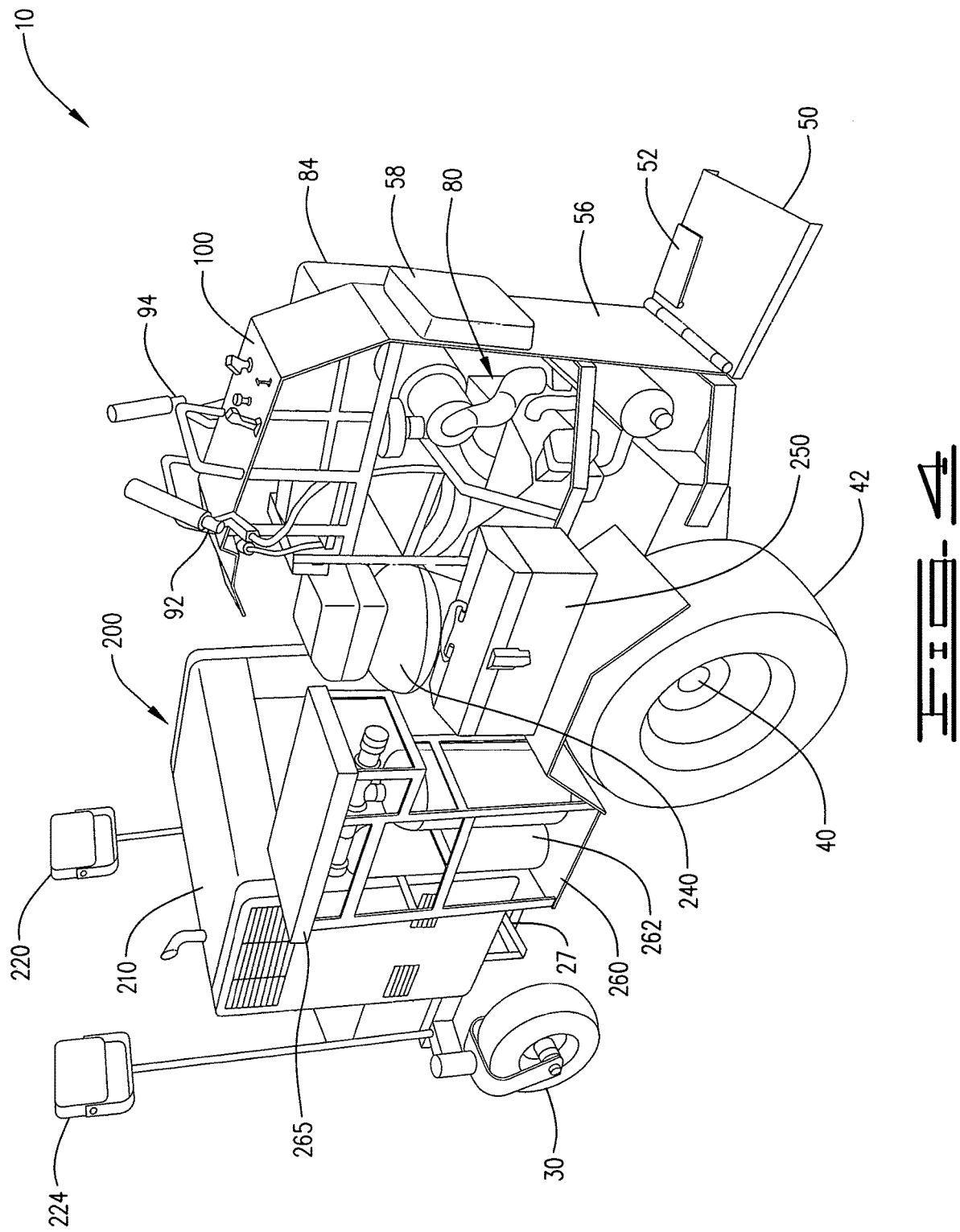
FIG. 4 is a rear left side perspective view of the mobile welding station.
Figure 5:
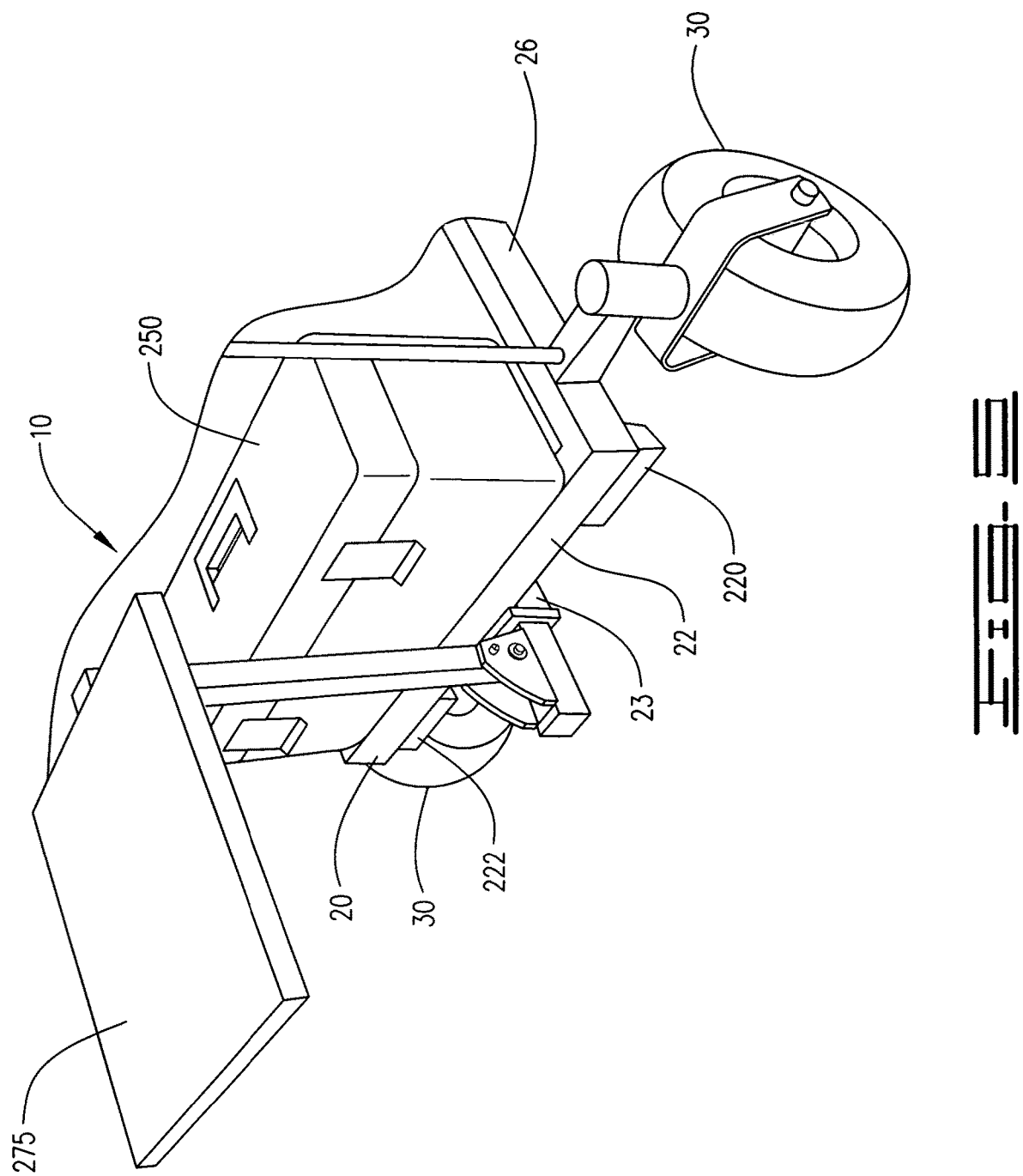
FIG. 5 is a detail view of the front of the mobile welding station with a work table in a deployed position attached within the front receiver hitch.

The secondary electrical energy supply is also directed to the air compressor supply system 240 attached to the base frame 20, FIG. 4, to generate compressed air to optional air tools, including air grinders, air wrenches, air cutting tools and compressed air supplies required by certain welding machines, including the welding machine 210 from which the compressed air supply derives its power. The secondary electrical energy supply may also provide energy to a forward lighting means 220, shown in FIGS. 1-5, comprising at least one lower running light 222 directed ahead of the mobile welding station 10 and at least one elevated lighting panel 224 having the capacity for omnidirectional angular vertical movement and radial movement surrounding the mobile welding station 10 for illumination of a work area. Each at least one running light 222 and each at least one elevated lighting panel 224 has a respective power switch 106, 107, located within the stationary control panel 100, as shown in FIG. 7. Alternatively, this forward lighting means 220 may be powered by the mobility power supply 80 as opposed to or in addition to the utility power supply 200 during movement of the mobile welding station 10 when the welding machine 210 is not operational, especially where movement is desired in areas of poor visibility or at night. Most preferable, the lower running lights 222 would be operated off the 12 volt D/C power supply from the mobility drive system and the elevated panel lights 224 would operate off of the 110 volt A/C power supply. Additionally, the elevated panel lights 224 would be mounted on a telescopic pole of varied and adjustable height, not shown.

Abundant welding accessory equipment is optionally provided on the mobile welding station 10 as shown in FIGS. 1-5 and 7. In FIG. 1, there are locking tool boxes 250 to retain and secure tools welding rod, and welding accessories, a fire extinguisher 255 in the event of a fire at or near the mobile welding station 10, and a welding lead rack 252 to retain welding leads 215 attached to the welding machine 210. The front frame member 22 is shown in FIGS. 1 and 3 to incorporate a square hitch receiver 23, which is provided as a secure mounting location for accessory tools configured to be inserted and retained within the square hitch receiver 23, shown in FIG. 5 as a folding elevated platform 275. The attachments which could be installed within the square received hitch could include elevated pedestal vises, bench grinders, pipe cutters, pipe clamps, etc.

FIGS. 3 and 4 indicate additional welding accessory equipment, including a lower storage frame 27 for retaining items including the above folding elevated platform 275 in a folded position, additional locking tool boxes 250 for containing welding tools, cutting torches and nozzles, a gas bottle rack 260 containing one or more gas bottles 262, gauges 264 and hoses within, including but not limited to oxygen bottles, acetylene bottles or other welding gas bottles, and a locking upper lid 265 on the gas bottle shelf 260 to lock the bottles and gauges within as well as providing a flat platform for work. A plasma cutter could also be installed and secured within the gas bottle rack where a plasma cutter is substituted for the gas bottles and cutting accessories, with the plasma cutter connecting to the secondary power supply.

In the event the retractable left and right control levers 92, 94, are used, FIG. 7 indicates a front grab handle bar 108 and rear grab handle bar 109 which are used to stabilize the operator grip on each respective left and right retractable control lever 92, 94, by use of the front grab handle bar 108 when applying forward pressure to a respective control lever, and by use of the rear grab handle bar 109 when applying rear pressure to a respective control lever, isolating the operator's grip to the hand only instead of having to use the whole arm for steering and guidance. It has been determined by those familiar with this retractable left and right control levers that these grab handle bars 108, 109, reduce the amount of energy required to steer devices using this technology, increase acuity and control of the operator's steering skills and enhance fine motor control of the devices in controlling the speed and direction of the applied devices during movement. For the protection of the operator, a protective panel 56 is affixed to the mobile welding station 10 behind the stationary control panel 100 and the operator platform 50 to prevent the operator from coming into contact with the mobility drive system 80 or being exposed to the exhaust heat and fumes from the engine 82. This protective panel 56 may also include a bumper pad 58 to allow the operator to steady themselves against the protective panel 56 while standing on the operator platform 50 for enhanced balance and control, especially needed due to the operator having to stand unevenly on the operator platform due to having one foot required to be in contact with the deadman safety pedal 52.

Figure 6:
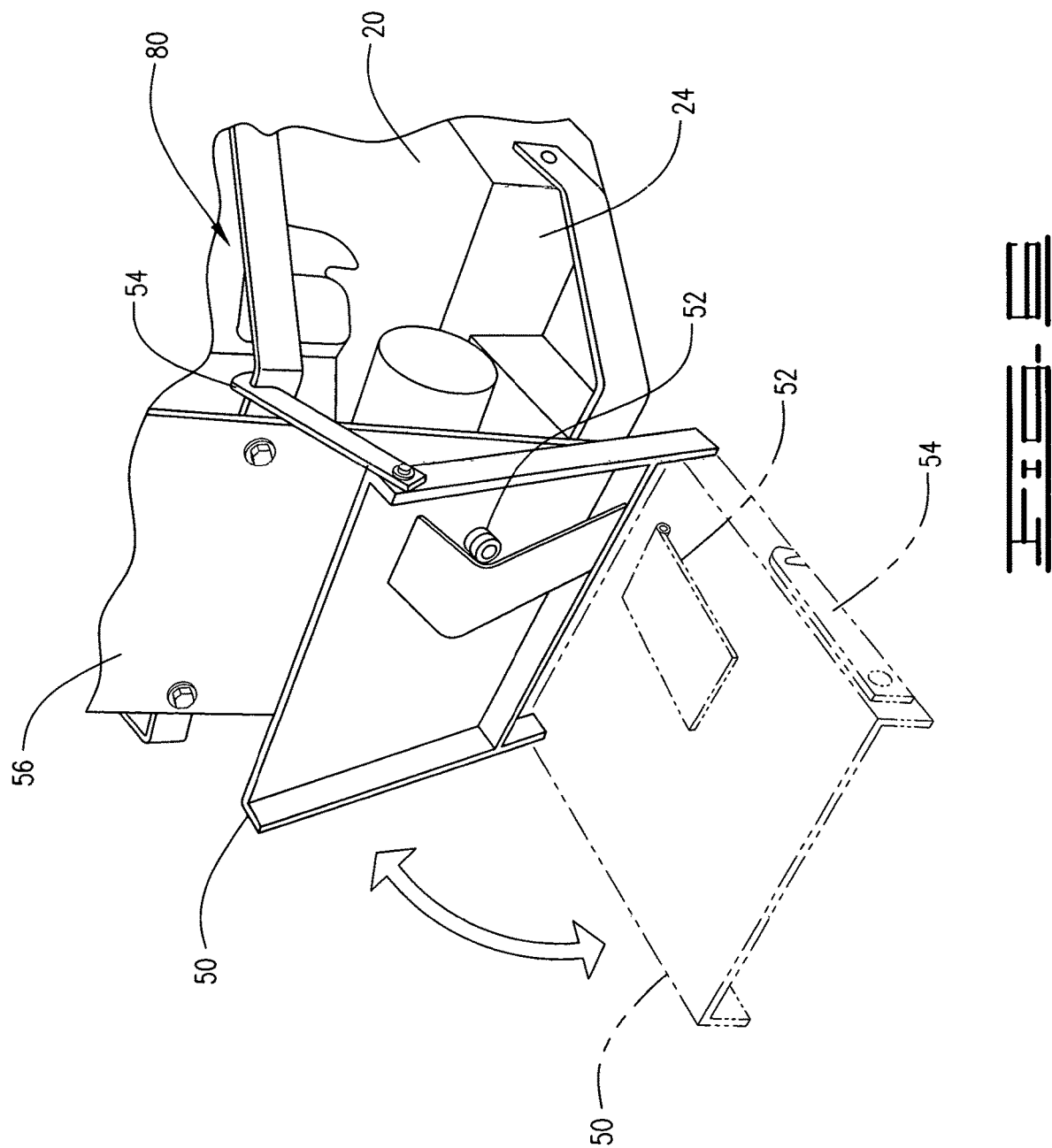
FIG. 6 is a detail view of the rear of the mobile work station with the operator standing platform in a retracted position with a phantom line indicating the operator platform in an operating position.
Figure 7:
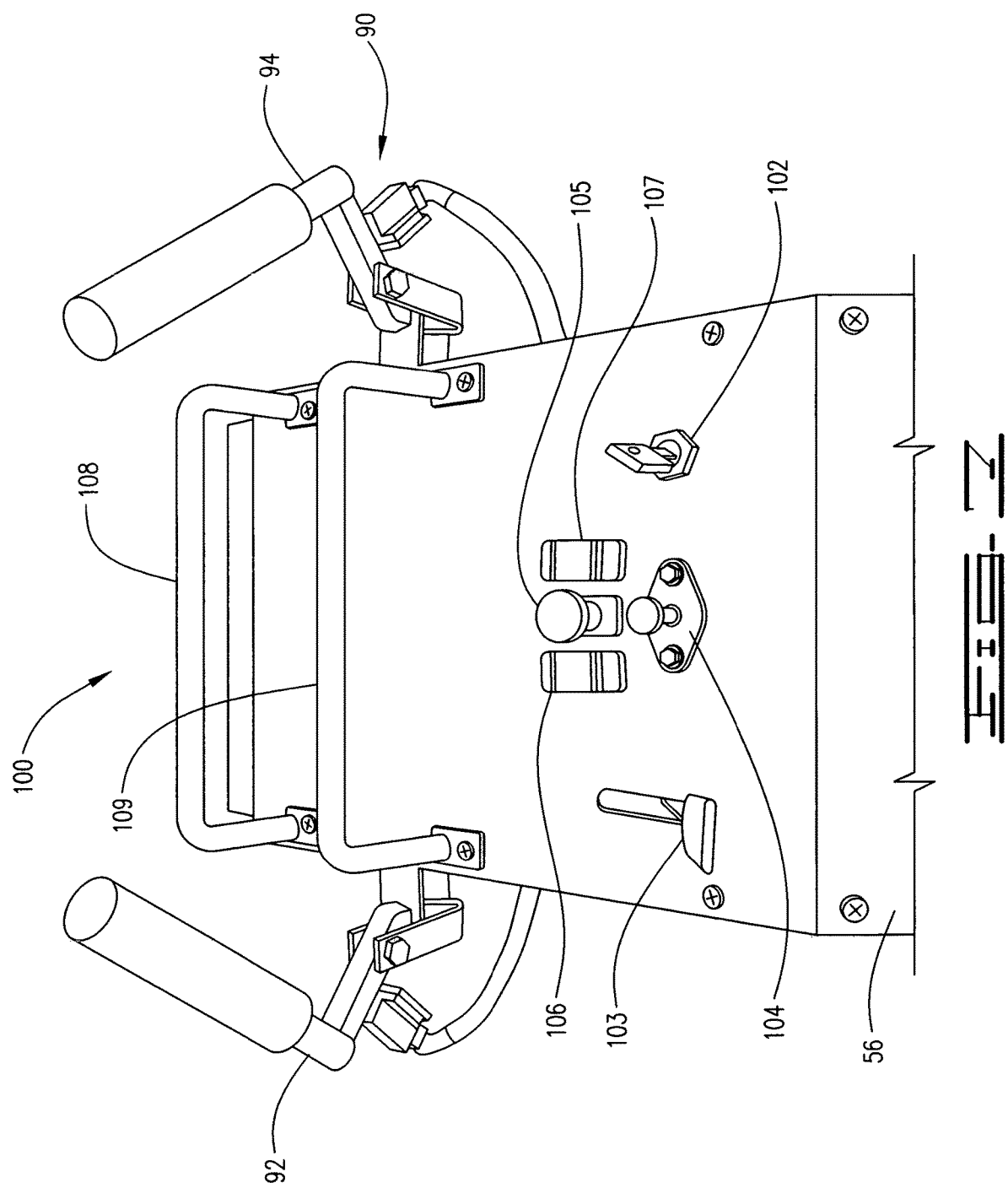
FIG. 7 is a detail view of the operational control panel from an operator's perspective including a first embodiment of the steering and movement control means, shown as two retractable control levers, providing a zero turn radius capability.

When the operator platform 50 is in the up position, shown in FIG. 6 in solid lines, the mobility power supply cannot be engage and a locking means 54 prevents unintentional lowering of the operator platform 50 until disengaged by the operator. When the operator platform 50 is lowered, shown in the phantom lines of FIG. 6, the operator may occupy the operator platform 50, depress the deadman safety pedal 52, start the mobility drive system 80 and commence movement of the mobile welding station 10 as controlled by the operator. The provision of the operator platform 50 is preferred to position the operator in a standing position as opposed to a seated position is for two primary reasons. First, a standing operator can see over the other equipment on the mobile welding station 10 during movement for a clear view of what lies ahead in the chosen path. Second, by standing, the foot of the operator has the entire body weight of the driver above the foot with flexion of the knees absorbing bumps, with less chance of the foot being disengaged from the deadman safety pedal 52.

One of the most significant and novel objectives of the mobile welding station 10 is a compact size. In this regard, as shown in FIG. 1, the mobile welding station 10 is defined as "compact", which is an indefinite term by itself. Therefore, for purposes of defining "compact", weight and dimension will be part of that definition. The width (γ) of the mobile welding station 10 should be no more than 4-5 feet, or the width of a freight elevator door, a single car garage door, or a utility trailer used on a roadway. The length (χ) of the device, because of its economical placement of components and efficient component configuration, should be no more than 6-8 feet. Optimally, the entire mobile welding station 10 has a profile close to the size of a standard 4×8 foot sheet of plywood or commercial riding lawnmower.

Much of the length and width consideration in providing the profile of the mobile welding device 10 depends upon the size of the welding machine, the size of the wheels, motor and base frame, which could vary from a small mobile welding station to a much larger mobile welding station, depending on the market needs. "Compact" also is defined by the weight of the mobile welding station, which is intended to be below the weight limitations of a freight elevator, generally between 1200 and 2500 pounds, once again varying in weight from a small mobile welding station to a larger mobile welding station, depending on the market needs. By fitting into this size space and within the weight limitations defined above, the mobile welding device 10 can be transferred between floors of a multiple story building under construction or after occupancy if a welding task is required, even being capable of being transported to a building structure roof by elevator or light duty crane, hoist or wench. Choice of base frame materials can be a variable, the base frame 20 being made from tubular aluminum or steel, as well as auxiliary support members which could comprise the base frame 20.

It is certain that other additional components may be incorporated into a mobile welding station 10, but the essential components of the present mobile welding station 10 are disclosed for purposes of the claimed subject matter. Therefore, while the present mobile welding station 10 has been particularly shown and described with reference to a preferred embodiment thereof, it will be understood by those skilled in the art that changes in form and detail may be made therein without departing from the spirit and scope of the invention.

What is claimed is:

1. A mobile welding station providing a unitized self-contained welding, electrical power generation and compressed air supply on a self-contained independent drive and steering system with a capacity to be moved under power within a construction site, farming operation, multiple floors of an occupied building, a building under construction, a manufacturing complex, a maintenance facility, or outdoor locations where no other local power supply is available, the mobile welding station comprising:
   a base frame defining a front member, a rear member and two side members;
   a mobility drive system defining at least one powered rear axle with two independent driven rear wheels and at least one front wheel, an operator platform providing a deadman safety pedal which requires operator engagement in order for the mobility drive system to function, an engine, a fuel tank, a D/C battery and a stationary control assembly providing a starter, throttle, choke, and a movement control means proving directional and speed control to said mobile welding station;
   a utility power system provided by a welding machine which supplies not only the welding machine with leads for welding operations, but also a secondary A/C power supply to operate an A/C control assembly with at least one 110 volt A/C outlet and at least one 220 volt A/C outlet, and
   a compressed air supply system; and
   a gas bottle rack containing gas welding bottles and gauges, wherein said mobility drive system and utility power supply are independent, having the capacity for one to be used with or without the other.

2. The mobile welding station of claim 1 further comprising:
   said front member of said base frame defining a square receive hitch to support a folding elevated platform or other suitable accessory;
   a lower storage frame along said side member for containing and carrying a collapsible welding accessory;
   said operator platform having a pivotal engagement with said rear support member, said rear support member further defining a protective panel extending between said operator platform and said stationary control assembly for safety and protection from the mobility drive system during operation.

3. The mobile welding station of claim 1, further comprising:
   said welding machine having internal integrated controls and welding leads;
   said A/C electrical control assembly defining a voltage regulator for supply to a plurality of 110 A/C outlets and at least one 220 A/C outlet within a power strip;
   said forward lighting means defining at least one lower running light and at least one elevated panel light, said forward lighting means attached to a respective run light switch and at least one panel light switch integrated within said stationary control assembly for activation of each respective said at least one lower running light and said at least one elevated panel light; and
   said at least one elevated panel light having a capacity for omnidirectional angular vertical movement and radial movement surrounding said mobile welding station.

4. The mobile welding station of claim 1, further comprising:
   said movement control means defining a left retractable control lever and a right retractable control lever, wherein engaging, pulling, and/or pushing each said retractable control lever independently, provides operational control including movement outward for disengagement of said mobility drive system, inward into a respective middle neutral position, independent forward action for a corresponding forward movement of each said independent rear drive wheel, independent rear action into a corresponding rear movement of each said independent rear drive wheel, or a separate forward and rear action of each left and right control lever, independently, to steer said mobile welding platform in a controlled left or right direction.

5. The mobile welding station of claim 1, further comprising additional accessories including:
   a knee pad attached to a protective panel extending between said operator platform and said stationary control assembly for safety and protection from the mobility drive system during operation;
   a welding lead rack adjacent to said welding machine having welding leads stored upon said welding lead rack;
   said gas bottle rack defining a locking upper lid to secure said gas bottles and gauges within said gas bottle rack;
   a front grab handle and rear grab handle extending respectively from said stationary control assembly in front of and behind said movement control means to stabilize operation of said movement control means during operation of said mobility drive system;

one or more locking tool boxes; and a fire extinguisher, said fire extinguisher, said locking tool boxes, said gas bottle rack and said welding lead rack attached to said base frame.

6. The mobile welding station of claim 1, wherein said mobile welding station provides a compact profile defining a width of no more than 4-5 feet, a length of no more than 6-8 feet and a weight of no more than 2500 lbs., thereby conforming said mobile welding station to be transported within a standardized size and weight limitation of a commercial freight elevator in a commercial building or multiple story building.

\* \* \* \* \*